No. 675,958. Patented June 11, 1901.
H. LIEBERT.
MILLING CUTTER.
(Application filed Sept. 25, 1900.)
(No Model.)
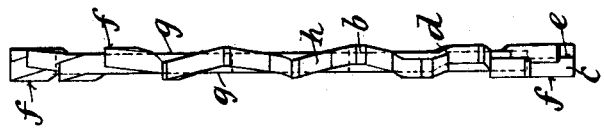
Fig. 2.
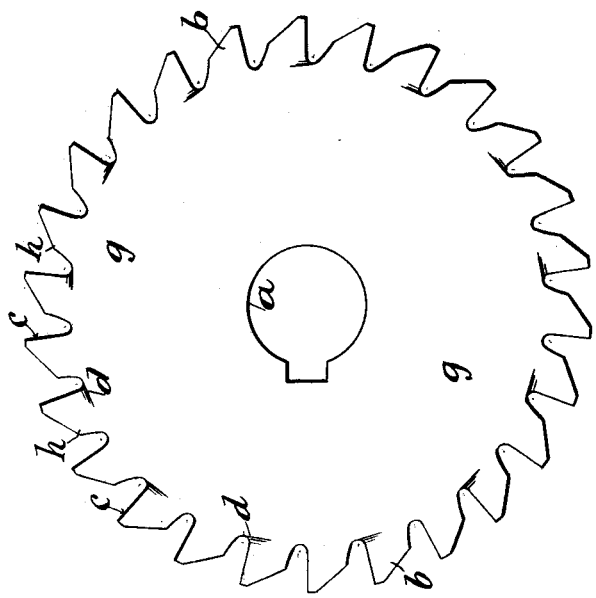
Fig. 1.
Fig. 3.
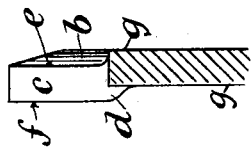
WITNESSES:
Ella L. Giles
INVENTOR
Henry Liebert
BY
Richardson
ATTORNEYS

UNITED STATES PATENT OFFICE.

HENRY LIEBERT, OF MILNROW, ENGLAND.

MILLING-CUTTER.

SPECIFICATION forming part of Letters Patent No. 675,958, dated June 11, 1901.

Application filed September 25, 1900. Serial No. 31,058. (No model.)

*To all whom it may concern:*

Be it known that I, HENRY LIEBERT, a subject of the Queen of Great Britain, residing at Milnrow, in the county of Lancaster, Kingdom of Great Britain, (whose post-office address is Perseverance Works, Milnrow aforesaid,) have invented new and useful Improvements in Rotary or Milling Cutters, (for which I have made application for patent in Great Britain, No. 7,161, bearing date April 18, 1900,) of which the following is a specification.

My invention relates to improvements in rotary or milling cutters. Hitherto such cutters have been forged of steel, the sides thereof had to be turned, the spindle-hole bored, and the teeth milled in.

The object of my invention is to provide a rotary or milling cutter formed of sheet-steel which dispenses with the said forging, turning, boring, and milling and can thus be produced much quicker and cheaper. I attain these objects as illustrated in the accompanying drawings, in which—

Figure 1 is a side view, Fig. 2 an edge view, and Fig. 3 an enlarged sectional view, of my improved rotary or milling cutter.

Similar letters refer to similar parts throughout the several views.

In carrying out my invention I form my improved rotary or milling cutter of sheet-steel by first stamping out the spindle-hole $a$ and then the teeth $b$ concentrically around it. To cause the tooth sides to clear the work, and thus prevent friction between the same, I afterward crank or bend in a suitable press the front $c$ of each tooth at its root $d$ outwardly in alternate fashion (see more particularly Fig. 3) in such a manner that the edges $e f$ of each tooth front are parallel with the body or sides $g$ of the cutter, and the inner edge $e$ of each tooth front overlaps that of the next one, (see more particularly Fig. 2,) and the outer edge $f$ projects from the sides of the cutter, while the back $h$ of the tooth remains in line with the body $g$ of the cutter.

In cranking or bending the teeth as described, although the grinding or sharpening of the teeth on the top will reduce the diameter of the cutter, the width of cut produced will remain the one size.

What I claim as my invention, and desire to secure by Letters Patent, is—

A rotary or milling cutter having teeth with radially-extending leading edges, each tooth being twisted at its root to bring the body of the tooth in a plane inclined to the cutter and with said leading edge parallel from the root to the top of the tooth to the face of the cutter and with inner front edges overlapping each other, substantially as described.

In witness whereof I have hereunto set my hand in presence of two witnesses.

HENRY LIEBERT.

Witnesses:
 ALFRED BOSSHARDT,
 STANLEY E. BRAMALL.